US012065250B2

United States Patent
Shea et al.

(10) Patent No.: US 12,065,250 B2
(45) Date of Patent: Aug. 20, 2024

(54) RECIRCULATION GROUND MAINTENANCE MODE

(71) Applicant: Hamilton Sundstrand Corporation, Charlotte, NC (US)

(72) Inventors: Brian R. Shea, Windsor, CT (US); Peter Zywiak, Avon, CT (US); Luke Martin, Rockton, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 123 days.

(21) Appl. No.: 17/116,224

(22) Filed: Dec. 9, 2020

(65) Prior Publication Data
US 2022/0177141 A1    Jun. 9, 2022

(51) Int. Cl.
*B64D 13/06* (2006.01)
*B64D 13/02* (2006.01)
(Continued)

(52) U.S. Cl.
CPC ............ *B64D 13/06* (2013.01); *B64D 13/02* (2013.01); *B64D 13/08* (2013.01); *B64D 41/00* (2013.01);
(Continued)

(58) Field of Classification Search
CPC ........ B64D 13/08; B64D 13/06; B64D 13/02; B64D 13/006; B64D 2013/0618;
(Continued)

(56) References Cited

U.S. PATENT DOCUMENTS 4,262,495 A    4/1981  Gupta et al.
4,263,786 A    4/1981  Eng
(Continued)

FOREIGN PATENT DOCUMENTS

DE    102008035123 A1    2/2010
EP    3333078 A1    6/2018
EP    3489143 A1    5/2019

OTHER PUBLICATIONS

"Canadair Regional Jet 100/200—Environmental Control System" Aug. 19, 2019; Retrieved from the Internet <URL: https://www.smartcockpit.com/docs/Bombardier_CRJ_200-Environmental_Control_System.pdf> [retrieved on Mar. 31, 2022] pp. 1-39.
(Continued)

*Primary Examiner* — Gordon A Jones
(74) *Attorney, Agent, or Firm* — CANTOR COLBURN LLP

(57) ABSTRACT

An aircraft air conditioning system includes a lower cooling zone and an upper cooling zone. The lower cooling zone includes a lower recirculation heat exchanger configured to receive cabin air from a cabin and convert the cabin air into lower cooled recirculated cabin air. The upper cooling zone includes an upper recirculation heat exchange configured to receive the cabin air from the cabin and convert the cabin air into upper cooled recirculated cabin air. A power system selectively delivers power to the lower cooling zone and the upper cooling zone. A controller is in signal communication with the power system. The controller determines a target temperature of the cabin and invokes a recirculation ground maintenance mode that commands the power system to deliver power to one or both of the lower cooling zone and the upper cooling zone so that a temperature of the cabin reaches the target temperature.

6 Claims, 5 Drawing Sheets

(51) Int. Cl.
   *B64D 13/08* (2006.01)
   *B64D 41/00* (2006.01)
(52) U.S. Cl.
   CPC ............... *B64D 2013/0611* (2013.01); *B64D 2013/0618* (2013.01); *B64D 2013/0688* (2013.01)
(58) Field of Classification Search
   CPC .... B64D 2013/0688; B64D 2013/0611; B64D 2013/064; B64D 2013/0644; B64D 2013/0655; B64D 2221/00; B64D 33/02; B64D 33/04; F02C 6/08
   See application file for complete search history.

(56) References Cited

U.S. PATENT DOCUMENTS

| | | | | |
|---|---|---|---|---|
| 4,835,977 | A * | 6/1989 | Haglund | B64D 13/08 62/434 |
| 5,695,396 | A * | 12/1997 | Markwart | B64D 13/00 454/71 |
| 6,209,330 | B1 * | 4/2001 | Timmerman | F24F 3/044 62/448 |
| 6,418,744 | B1 * | 7/2002 | Neal | B64F 1/364 62/298 |
| 6,681,591 | B2 | 1/2004 | Defrancesco et al. | |
| 7,121,100 | B2 | 10/2006 | Atkey et al. | |
| 7,685,838 | B2 * | 3/2010 | Hutton | B64F 1/364 62/434 |
| 9,016,087 | B2 * | 4/2015 | Urbain | F24F 1/022 62/239 |
| 9,889,939 | B2 * | 2/2018 | Zhang | B64D 13/08 |
| 2007/0158499 | A1 * | 7/2007 | Whittingham | A61L 9/20 244/118.5 |
| 2008/0264084 | A1 | 10/2008 | Derouineau et al. | |
| 2011/0212678 | A1 | 9/2011 | Brunnberg et al. | |
| 2013/0327891 | A1 * | 12/2013 | Zhang | B64D 13/08 244/118.5 |
| 2017/0144767 | A1 | 5/2017 | Mayo et al. | |

OTHER PUBLICATIONS

"Environmental Control System 1-15—Wikipedia" Mar. 2, 2019; Retrieved from the Internet <URL: https://web.archive.org/web/20190302201434/https://en.wikipedia.org/wiki/Environmental_control_system> [retrieved on Mar. 31, 2022] pp. 1-5.

Search Report issued in European Application No. 21212619.7; Application Filing Date Dec. 6, 2021; Date of Mailing Apr. 20, 2022 (15 pages).

* cited by examiner

RECIRCULATION GROUND MAINTENANCE MODE

BACKGROUND

Embodiments of the disclosure relate to environmental control systems, and more specifically to an environmental control system of an aircraft.

The trend in the aerospace industry today is towards systems with higher efficiency. Modern wide body commercial aircraft are trending toward inclusion of a Supplemental Cooling System (SCS herein) that supplements aircraft cooling operations provided by the aircraft's main aircraft Environmental Control System (ECS). The SCS includes a conditioned fluid loop that ties into the recirculation air system via a heat exchanger to cool recirculation air. The SCS fluid may be conditioned via a range of cooling sources, including but not limited to a vapor cycle refrigeration system. The cooled recirculated air is used to cool the aircraft cabin, while the vapor cycle refrigeration system dumps the heat load to either a coupled fluid loop or directly to an aircraft ram air circuit included in the ECS. Currently, the SCS operates while the entire ECS (including the ECS pressurization air Conditioning kits referred to as "PACKS") is also operating in order to provide cabin temperatures within the required range with typical passengers on board and typical aircraft level heat loads operational.

BRIEF DESCRIPTION

According to a non-limiting embodiment, an aircraft air conditioning system includes a lower cooling zone and an upper cooling zone. The lower cooling zone includes a lower recirculation heat exchanger configured to receive cabin air from a cabin and convert the cabin air into lower cooled recirculated cabin air. The upper cooling zone includes an upper recirculation heat exchange configured to receive the cabin air from the cabin and convert the cabin air into upper cooled recirculated cabin air. A power system selectively delivers power to the lower cooling zone and the upper cooling zone. A controller is in signal communication with the power system. The controller determines a target temperature of the cabin and invokes a recirculation ground maintenance mode that commands the power system to deliver power to one or both of the lower cooling zone and the upper cooling zone so that a temperature of the cabin reaches the target temperature.

According to another non-limiting embodiment, a method of operating an aircraft air conditioning system is provided. The method comprises delivering cabin air to a lower recirculation heat exchanger included in a lower cooling zone to generate lower cooled recirculated cabin air and delivering the cabin air to an upper recirculation heat exchanger included in an upper cooling zone to generate upper cooled recirculation air. The method further comprising generating power via a power system, and invoking, via the controller, a recirculation ground maintenance mode to command the power system to deliver power to one or both of the lower cooling zone and the upper cooling zone so as to output one or both of the lower cooled recirculated cabin air and the upper cooled recirculated cabin to an aircraft cabin.

BRIEF DESCRIPTION OF THE DRAWINGS

The following description should not be considered limiting in any way. With reference to the accompanying drawing, like elements are numbered alike.

DETAILED DESCRIPTION

A detailed description of one or more embodiments of the disclosed apparatus and method are presented herein by way of exemplification and not limitation with reference to the Figure.

Airline maintenance operations sometimes require minimal staff onboard for cleaning procedures and maintenance tasks. In order to keep a habitable environment, many times the full ECS (including the ECS PACKS) is run along with the SCS to provide conditioned air supply into the cabin and flight deck. The ECS air conditioning PACKS represent a significant load on the ECS and require a substantial amount of power to operate. Therefore, operating the ECS conditioning PACKS consumes a large amount of fuel. However, in instances where maintenance operations are performed, overall occupancy of the aircraft is very low (only a few people on board) and thus operation of the full ECS is unnecessary.

One or more non-limiting embodiments described herein aircraft air conditioning system configured to selectively initiate a recirculation ground maintenance mode configured to provide cool air while reducing the power to the ECS. The recirculation ground maintenance mode controls flow of recirculated cabin air and cooled recirculated cabin air through a recirculation circuit without operating the ECS at full capacity. For example, the ram air system of the ECS can be operated without operating the ECS PACKS. The ram circuit can contain additional heat exchanges tied directly or via coupled fluid loops to the Supplemental Cooling System (SCS). In this manner, the aircraft cabin can be cooled without operating the ECS at full capacity, thereby significantly reducing fuel costs and improving power efficiency.

In one or more non-limiting embodiments, the recirculation ground maintenance mode is configured to invoke a plurality of different cooling zones of the aircraft air conditioning system. The different cooling zones include, for example, a lower cooling zone, an upper cooling zone, and a combined upper and lower cooling zone. Selecting or deselecting the different cooling zones controls the flow of the recirculated cabin air and cooled recirculated cabin air through the recirculation circuit. A particular zone can be selected based on a desired or target temperature of the aircraft cabin. In this manner, the precision of the aircraft cabin temperature can be improved without requiring full operating capacity of the ECS as described herein.

Figure 1:
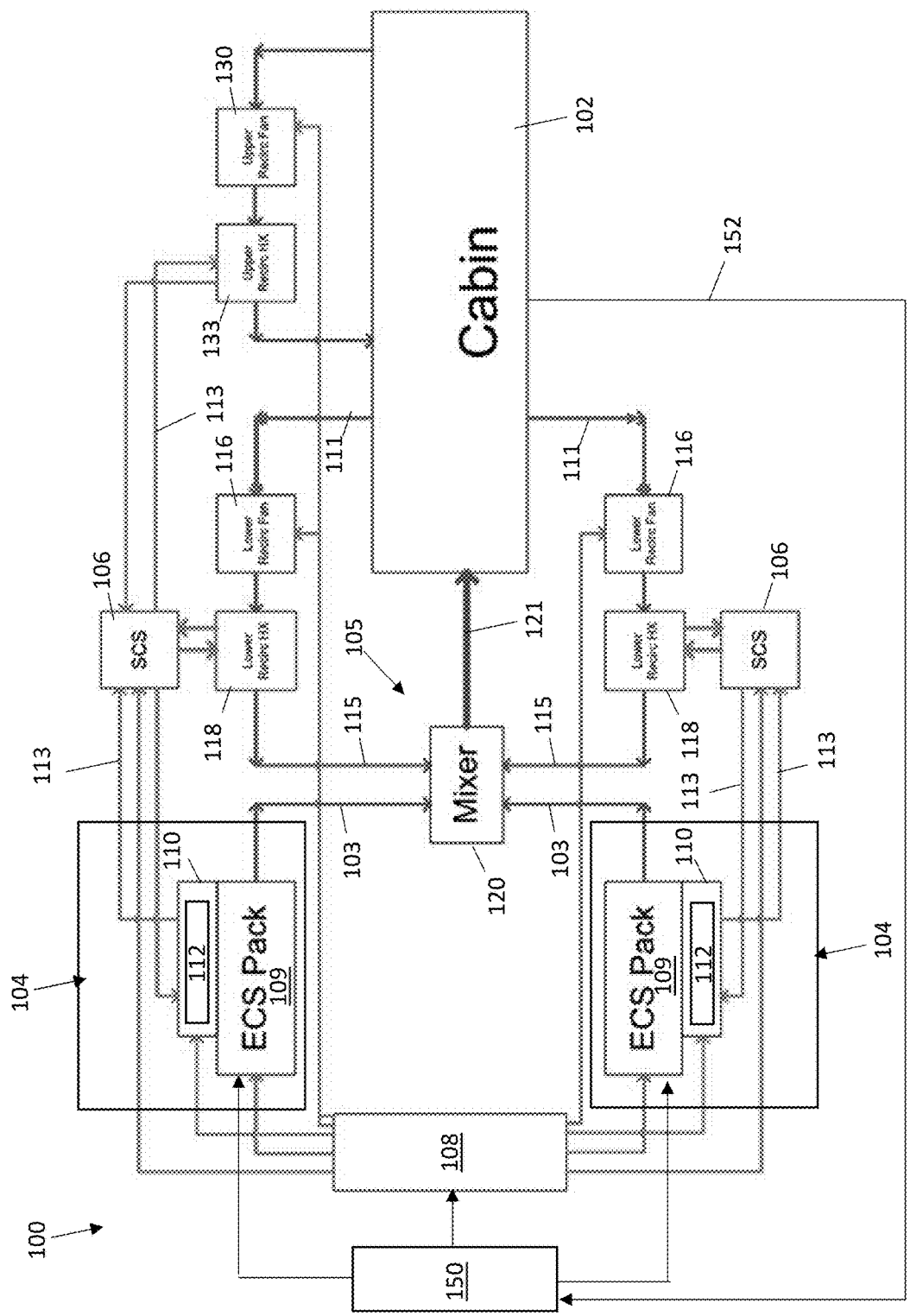
FIG. 1 illustrates an aircraft air conditioning system according to a non-limiting embodiment.

With reference now to FIG. 1, an aircraft air conditioning system 100 is illustrated according to a non-limiting embodiment. The air conditioning system 100 in configured to selectively initiate a recirculation ground maintenance mode configured to control a temperature of an aircraft cabin 102. The aircraft air conditioning system 100 includes an environmental control system (ECS) 104, a cabin recirculation system 105, the supplemental cooling system (SCS) 106, a power system 108, and a controller 150.

The ECS 104 includes one or more ECS outlets 103 configured to introduce fresh air into the aircraft air condition system 100. The ECS 104 includes one or more pressurization air cycle kits (PACKS) 109, a ram circuit 110, and a ram air fan 112. In one or more non-limiting embodiments, an individual PACK 109 includes an air cycle machine (ACM), bleed air source (not shown), and mixing valves (not shown). The PACKS 109 condition bleed air delivered thereto via the ACM to remove excessive heat, and supplies the conditioned air to the cabin 102 at a desired temperature. In one or more embodiments, the output of the PACKS 109 are substantially reduced or the PACKS 109 are completely deactivated when the recirculation ground maintenance mode is activated, as described in greater detail below.

A ram fan 112 included in the ram circuit 110 is configured to draw fresh air through the ram circuit 110. In one or more embodiments, the ram fan 112 is controlled independently from the PACKS 109. Accordingly, the PACKS 109 can be deactivated while activating the ram fan 112 to draw air through the ram circuit 110. The air source can be adapted to generate the fresh air at an elevated pressure, for example, at a pressure of about 1.25 bar to about 3.5 bar. Furthermore, the fresh air provided by the elevated pressure air source can have a temperature of about +200° C. The fresh air can include bleed air generated by the aircraft engine or compressed air generated by the power system 108 or a cabin air compressor (sometimes referred to as a cabin air supercharger).

The cabin recirculation system 105 includes a lower cooling zone and an upper cooling zone. The cooling zones can be selective invoked or activated to achieve different cooling temperatures. For example, the upper cooling zone can be invoked or selected without invoking or selecting the lower cooling zone to achieve a first cooling temperature or the highest cooling temperature. The lower cooling zone can be invoked or selected without invoking or selecting the upper cooling zone to achieve a second cooling temperature or a medium cooling temperature. The lower and upper cooling zones can be both be invoked (i.e., activated simultaneously) to achieve a third cooling temperature or the coldest cooling temperature. The different zones also allow for fault toleration. For example, if a component in the upper cooling zone fails, the lower cooling zone can still be invoked to provide cabin cooling capabilities.

The lower cooling zone includes one or more lower recirculation fans 116, one or more lower recirculation heat exchangers 118, and an air manifold 120. The lower recirculation fans 116 are selectively operable to draw recirculated cabin air 111 through a lower recirculation heat exchanger 118. The lower recirculation heat exchanger 118 is configured to recirculate a heat transfer fluid 113 (sometimes referred to as coolant). Accordingly, heat from the recirculated cabin air 111 is transferred to the heat transfer fluid 113, thereby facilitating the lower recirculation heat exchange 118 to output cooled recirculated cabin air 115 that can be delivered to the air manifold 120. In one or more embodiments, the input recirculated cabin air 111 has a temperature of about 110 degrees Fahrenheit (° F.) (about 43 degrees Celsius (° C.)), and output cooled recirculated cabin air 115 has a temperature that is reduced to about 60° F. (about 15° C.).

The manifold 120 is configured to receive to produce cooled cabin supply air 121. The cooled cabin supply air 121 is then delivered to the aircraft cabin 102. When the ECS 104 is switched on (e.g., the recirculation ground maintenance mode is deactivated), the manifold can mix the airflow delivered by the ECS 104 with the recirculated cabin air 111 and/or the cooled recirculated cabin air 115.

The SCS 106 is in fluid communication with the cabin recirculation system 105 and the aircraft cabin 102. The SCS 106 supplements aircraft cooling operations provided by ECS 104. The SCS 106 includes a recirculation heat transfer fluid path that recirculates the heat transfer fluid 113. The heat transfer fluid 113 can be used to cool the aircraft galley and/or various electronics. In one or more embodiments, the SCS 106 operates independently from the ECS 104 and the cabin recirculation system 105. Accordingly, the heat transfer fluid 113 can be selectively provided to one or more targeted lower recirculation heat exchangers 118 to facilitate cooling of the recirculated cabin air 111.

The power system 108 is configured to selectively deliver power to the ECS 104, the SCS 106, and the cabin recirculation system 105. For example, the power system 108 is configured to selectively deliver power to the ram fan 112 and the recirculation fans 116 and 130. The power system 108 can include an auxiliary power unit (APU) or external aircraft ground support equipment (simply referred to as an external power system).

The controller 150 is in signal communication with the power system 108 and is configured to initiate a recirculation ground maintenance mode. The recirculation ground maintenance mode controls flow of the recirculated cabin air 111 and cooled recirculated cabin air 115 through the cabin recirculation system 105 without operating the ECS 104 at full capacity (e.g., without operating the PACKS 109). The ability to cool the cabin 102 without operating the ECS 104 at full capacity significantly reduces fuel costs and improves power efficiency, while also prolonging the useful life of the ECS by reducing loads on the ECS components (e.g., compressor, fans, pumps, etc.). In one or more non-limiting embodiments, the recirculation ground maintenance mode is configured to invoke a plurality of different cooling zones of the aircraft air conditioning system 100. In one or more non-limiting embodiments, the cooling zones include a lower cooling zone, an upper cooling zone and a combined upper and lower cooling zone. Selecting or deselecting the different cooling zones controls the flow of the recirculated cabin air 111 and cooled recirculated cabin air 115 through the cabin recirculation system 105. The zones invoked can be selected based on a desired or target temperature of the aircraft cabin 102. For example, the controller 150 can store one or more target cabin temperatures and can receive a temperature signal 152 indicating a measured temperature of the cabin 102. In this manner, the controller 150 can invoke the lower cooling zone, the upper cooling zone, and/or a combination of the lower and upper cooling zones based on a comparison between a target cabin temperature and the temperature signal 152. Accordingly, the precision of the aircraft cabin temperature can be improved without requiring full operating capacity of the ECS 104.

Figure 2:
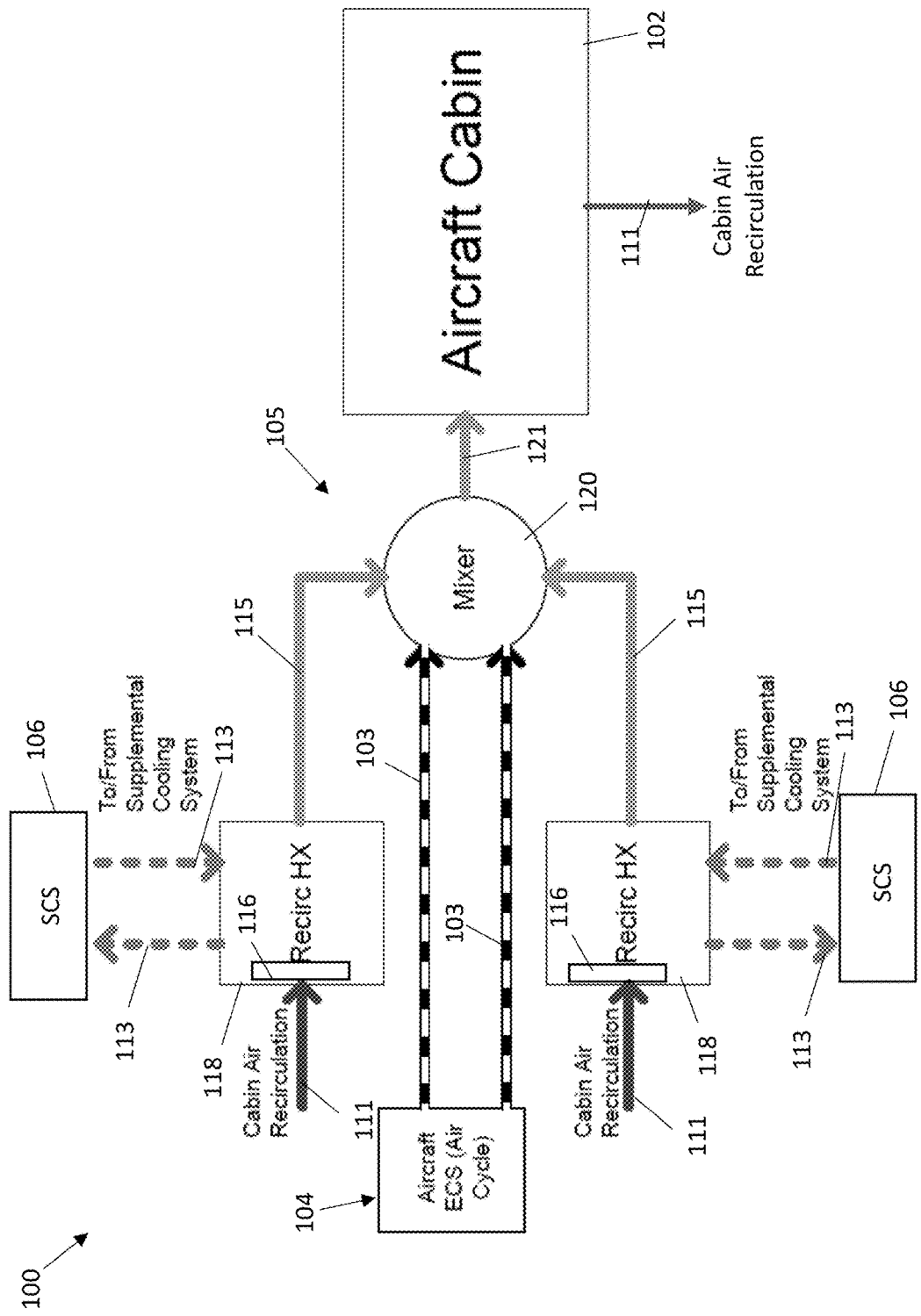
FIG. 2 illustrates the aircraft air conditioning system of FIG. 1 operating in a recirculation ground maintenance mode that invokes a lower cooling zone according to a non-limiting embodiment.

With reference to FIG. 2, operation of the recirculation ground maintenance mode with the lower cooling zone invoked. In response to invoking the lower cooling zone, the controller 150 adjusts a SCS liquid circuit diverter valve (not shown) into the first position so as to deliver the heat transfer fluid 113 to the lower recirculation heat exchanger 118, resulting in cool air delivered to the manifold 120. In addition, the ECS PACKS 109 are deactivated, thereby stopping flow to the mixer 120 as indicated by the dashed output 103. Accordingly, the manifold 120 receives the cooled recirculated cabin air 115 (e.g., lower cooled recirculated cabin air 115) and produces the cooled cabin supply air 121 which is delivered to the aircraft cabin 102.

Figure 3:
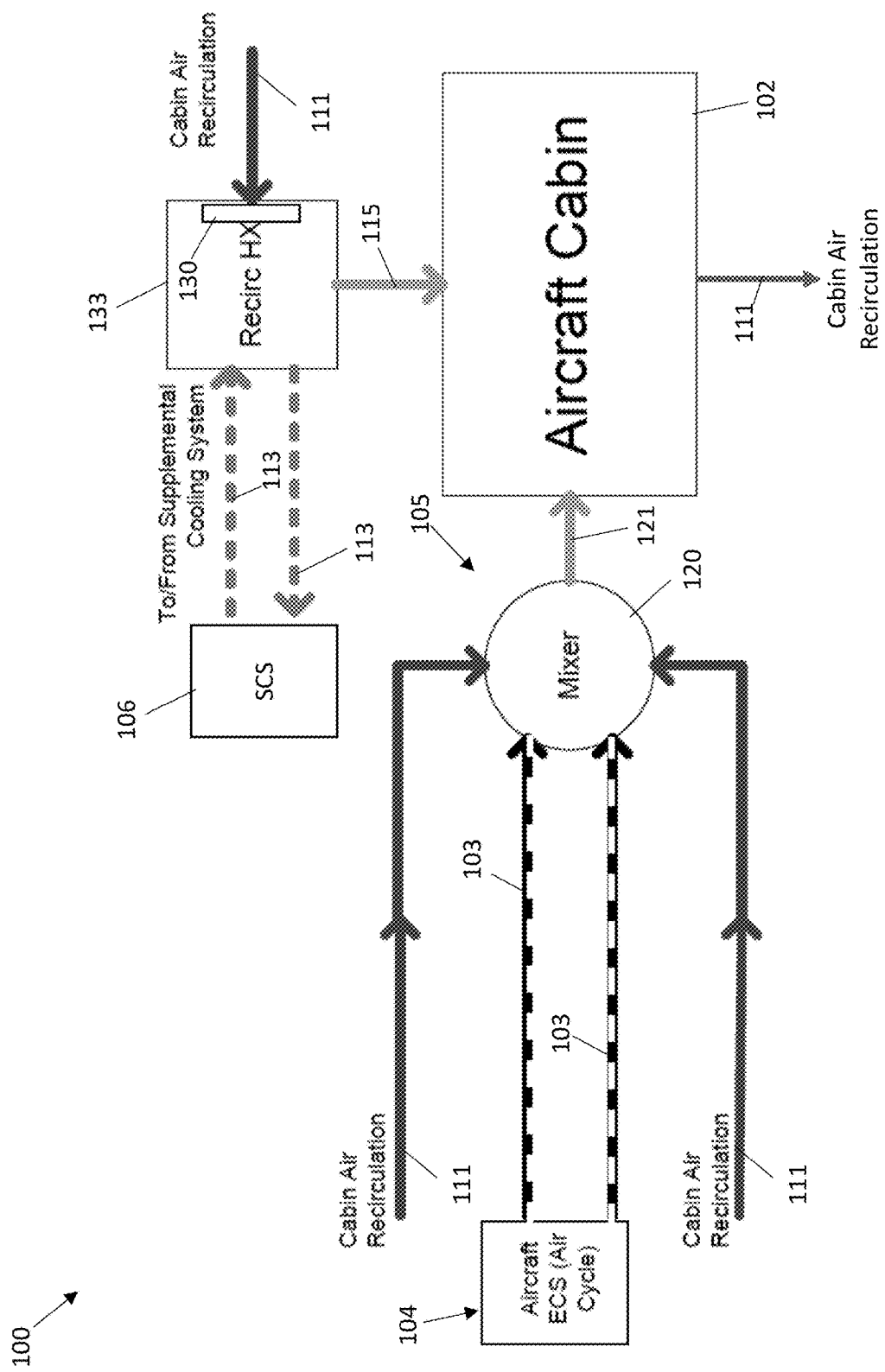
FIG. 3 illustrates the aircraft air conditioning system of FIG. 1 operating in a recirculation ground maintenance mode that invokes an upper cooling zone according to a non-limiting embodiment.

With reference to FIG. 3, operation of the recirculation ground maintenance mode is illustrated with the upper cooling zone invoked. An upper recirculation fan 130 and upper heat exchanger 133 is also coupled to the cabin path 127. As is the case when invoking the lower cooling zone, the ECS PACKS 109 are deactivated, thereby stopping flow to the mixer 120 as indicated by the dashed output 103. The upper recirculation fan 130 draws cabin recirculation air 111 to the upper heat exchange 133, which in turns outputs cooled recirculation air 115 (i.e., upper cooled recirculation air 115) directly into a low pressure distribution system and into the cabin 102. In addition, the manifold 120 receives the recirculated cabin air 111 to produce the cooled cabin supply air 121 that is also delivered to the cabin 102.

Figure 4:
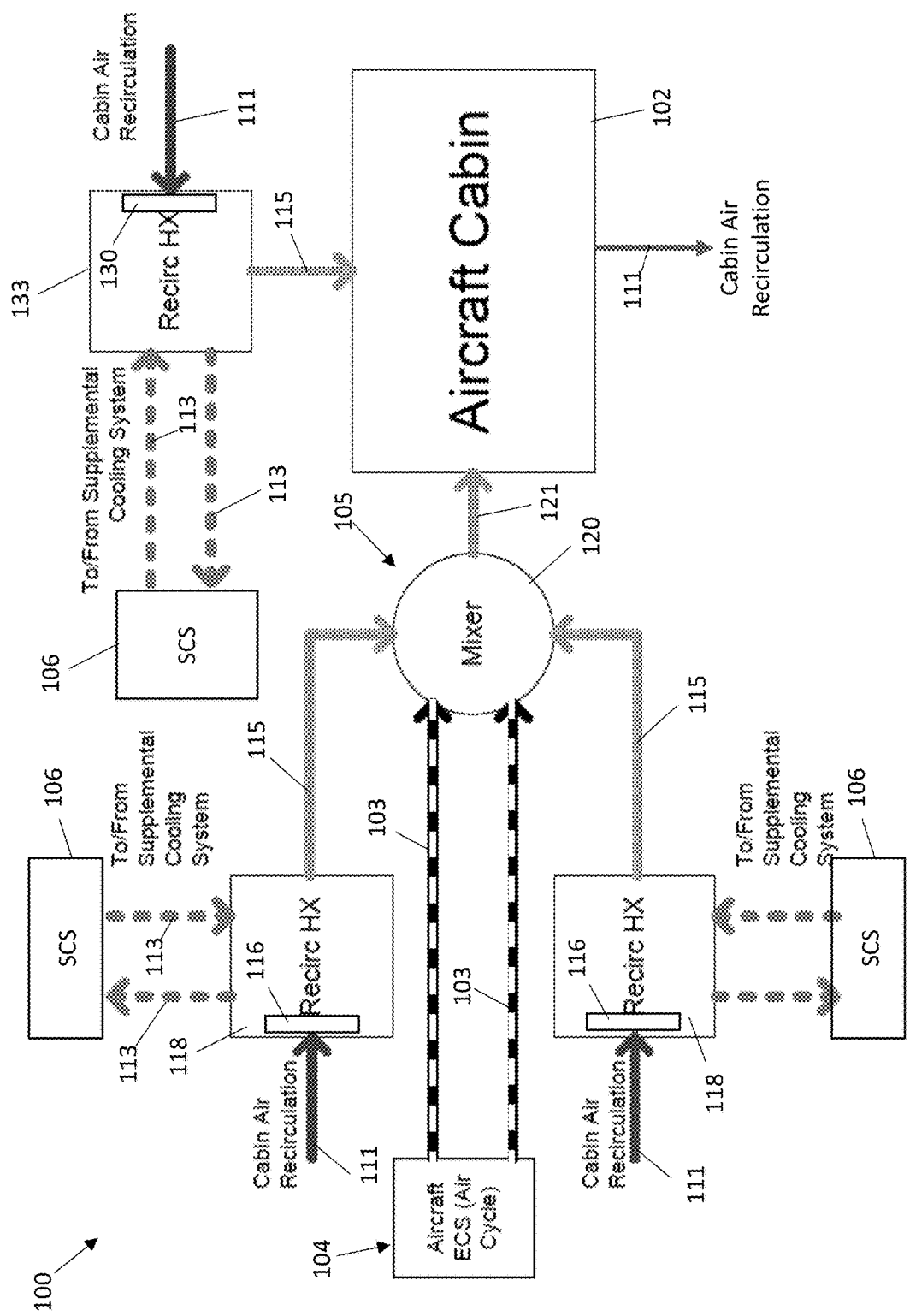
FIG. 4 illustrates the aircraft air conditioning system of FIG. 1 operating in a recirculation ground maintenance mode that invokes a combination of upper and lower cooling zones according to a non-limiting embodiment.

With reference to FIG. 4, operation of the recirculation ground maintenance mode is illustrated while invoking a combination of the upper and lower cooling zones. In response to invoking the upper and lower cooling zone, the ECS PACKS 109 are deactivated to stop flow to the mixer 120 as indicated by the dashed output 103. Cabin air is then simultaneously delivered to the lower cooling zone and the upper cooling zone. The manifold 120 receives the cooled recirculated cabin air 115 to produce the cooled cabin supply air 121 that is delivered to the aircraft cabin 102. In addition, cooled recirculated cabin air 115 is also delivered to the aircraft cabin 102. Because the cabin 102 receives cooled cabin supply air 121 having a reduced temperature (due to delivering cooled recirculated cabin air 115 into the manifold 120) while also directly receiving cooled recirculated cabin air 115 from the upper heat exchanger 133, the cabin temperature can be further reduced compared to the invoking only the lower cooling zone (see FIG. 2) or only the upper cooling zone (see FIG. 3).

Figure 5:
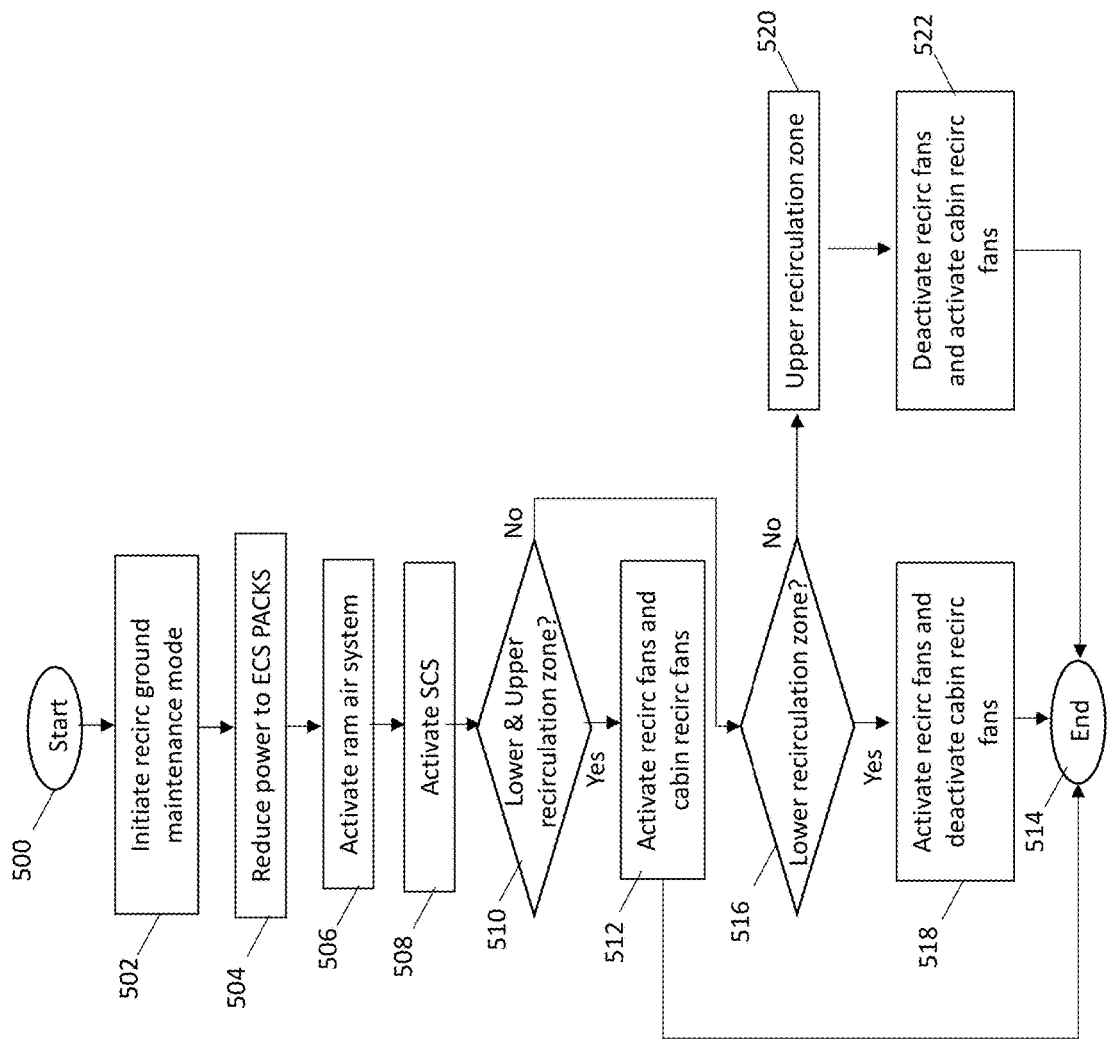
FIG. 5 is a flow diagram illustrating a method of operating an aircraft air conditioning system in a recirculation ground maintenance mode according to a non-limiting embodiment.

Turning now to FIG. 5, a method of operating an aircraft air conditioning system in a recirculation ground maintenance mode is illustrated according to a non-limiting embodiment. The method starts at operation 500, and at operation 502 the recirculation ground maintenance mode is initiated. At operation 504, power delivered to the PACKS of the ECS system is reduced. In one or more non-limiting embodiments, the power is completely disconnected such that the PACKS are deactivated. At operation 506, the ram air system is activated and the ram fan associated with the ram air system is initiated. At operation 508, the SCS is activated, and at operation 510 a determination is made as to whether the lower and upper recirculation zone is selected. When the lower and upper recirculation zone is selected, the lower recirculation fans associated with the lower cooling zone are initiated along with the upper recirculation fan associated with the upper cooling zone at operation 512, and the method ends at operation 514.

When, however, the lower and upper recirculation zone is not selected at operation 510, a determination is made at operation 516 as to whether the lower recirculation zone is selected. When only the lower recirculation zone is selected, the method proceeds to operation 518 to activate the lower recirculation fans and deactivate the upper recirculation fan associated with the upper cooling zone, and the method ends at operation ends 514.

When, however, the lower recirculation zone is not selected at operation 516, the method proceeds to operation 520 and selects the upper recirculation zone. At operation 522, the lower recirculation fans are deactivated and the upper recirculation fan associated with the upper cooling zone is activated, and the method ends at operation 514.

As described herein, one or more non-limiting embodiments provide an aircraft air conditioning system configured to selectively initiate a cooling recirculation ground maintenance mode. The recirculation ground maintenance mode controls flow of recirculated cabin air and cooled recirculated cabin air through a recirculation circuit without operating the ECS at full capacity. For example, the ram air system of the ECS can be operated in conjunction with a supplemental cooling system (SCS) without operating the ECS PACKS. In this manner, the aircraft cabin can be cooled without operating the ECS at full capacity, thereby significantly reducing fuel costs and improving power efficiency.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft air conditioning system comprising:
   a lower cooling zone including a lower recirculation heat exchanger, the lower recirculation heat exchanger configured to receive cabin air from a cabin and to convert the cabin air into lower cooled recirculated cabin air;
   a lower recirculation fan is configured to deliver a first portion of the cabin air to the lower recirculation heat exchanger in response to receiving the power from the power system, and wherein the lower recirculation heat exchanger is configured to convert the first portion of the cabin air into the lower cooled recirculated cabin air;
   an upper cooling zone including an upper recirculation heat exchanger, the upper recirculation heat exchanger configured to receive the cabin air from the cabin and to convert the cabin air into upper cooled recirculated cabin air;

an upper recirculation fan configured to deliver a second portion of the cabin air to the upper recirculation heat exchanger in response to receiving the power from the power system, and convert the second portion of the cabin air into the upper cooled recirculated cabin air;

a manifold configured to output cooled cabin supply air that is delivered to the cabin;

a supplemental cooling system (SCS) configured to recirculate a heat transfer fluid to and from one or both of the lower recirculation heat exchanger and the upper recirculation heat exchanger;

a pressurization air cycle kit (PACK) in signal communication with the power system to selectively receive the power, the PACK configured to condition fresh air to generated conditioned fresh air and output the conditioned fresh air to the manifold in response to receiving the power; and a power system configured to selectively deliver power to the lower cooling zone, the lower recirculation fan, the upper cooling zone, and the upper recirculation fan;

a controller in signal communication with the power system, the controller configured to determine a target temperature of the cabin and invokes a recirculation ground maintenance mode that commands the power system to deliver power to one or both of the lower cooling zone and the upper cooling zone so that a temperature of the cabin reaches the target temperature, wherein in response to invoking only the lower upper cooling zone during the recirculation ground maintenance mode, the controller commands the power system to deliver power to the lower recirculation fan while commanding the power system to disconnect from power to the upper recirculation fan, and the SCS recirculates the heat transfer fluid to and from the lower recirculation heat exchanger, wherein in response to invoking only the upper cooling zone during the recirculation ground maintenance mode, the controller commands the power system to deliver power to the upper recirculation fan while commanding the power system to disconnect from power to the lower recirculation fan, and the SCS recirculates the heat transfer fluid to and from the upper recirculation heat exchanger;

wherein in response to invoking a combination of the lower and upper cooling zones during the recirculation ground maintenance mode, the controller disconnects power to the ECS while connecting the power supply to the lower and upper recirculation fans and the SCS recirculates the heat transfer fluid to and from both the lower recirculation heat exchanger and the upper recirculation heat exchanger such that lower cooled recirculated cabin air is delivered to the manifold which outputs the mixed cooled cabin supply air to the cabin, and the upper cooled recirculated cabin air bypasses the manifold such that the upper cooled recirculated cabin air avoids mixing with the lower cooled recirculated cabin air provided by the lower cooling zone and is delivered directly to the cabin.

2. The aircraft air conditioning system of claim 1, further comprising:

a ram air circuit in fluid communication with the manifold.

3. The aircraft air conditioning system of claim 1, wherein in response in response to invoking the lower cooling zone, the lower cooled recirculated cabin air is delivered to the manifold to output the cooled cabin supply air.

4. The aircraft air conditioning system of claim 1, wherein in response to invoking the upper cooling zone, the upper cooled recirculated cabin air is delivered to the cabin while the lower cooled recirculated cabin air is blocked from reaching the manifold.

5. The aircraft air conditioning system of claim 4, wherein in response in response to invoking the upper cooling zone, the recirculated cabin air is delivered to the manifold to output the cooled cabin supply air.

6. The aircraft air conditioning system of claim 1, wherein in response to invoking a combination of the lower and upper cooling zones, the controller commands the power system to deliver power to the lower and upper recirculation fans.

* * * * *